United States Patent [19]
Frulio

[11] Patent Number: 6,000,525
[45] Date of Patent: Dec. 14, 1999

[54] APPARATUS FOR ALIGNING ITEMS HAVING AN APPROXIMATELY RECTANGULAR FOOTPRINT

[75] Inventor: Ralf Frulio, Jestetten, Germany

[73] Assignee: SIG Pack Systems AG, Beringen, Switzerland

[21] Appl. No.: 09/073,346

[22] Filed: May 6, 1998

[30] Foreign Application Priority Data

Jun. 16, 1997 [CH] Switzerland .............................. 1465/97

[51] Int. Cl.⁶ .................................................. B65G 47/26
[52] U.S. Cl. ........................... 198/412; 198/400; 198/411
[58] Field of Search .................................. 198/400, 411, 198/412, 413, 415, 416, 475.1, 457.01, 457.03, 457.06

[56] References Cited

U.S. PATENT DOCUMENTS

| | | |
|---|---|---|
| 2,912,093 | 11/1959 | Lauck . |
| 3,868,009 | 2/1975 | Billi et al. ........................... 198/412 X |
| 3,908,332 | 9/1975 | Ebbinghaus et al. . |
| 4,669,600 | 6/1987 | Fluck ................................. 198/412 X |
| 4,815,581 | 3/1989 | Deutschlander . |
| 5,310,041 | 5/1994 | Draghetti ................................ 198/412 |
| 5,318,165 | 6/1994 | Spatafora et al. ............... 198/475.1 X |
| 5,501,316 | 3/1996 | Hermening et al. . |
| 5,706,929 | 1/1998 | Easton ................................... 198/415 |

FOREIGN PATENT DOCUMENTS

| | | |
|---|---|---|
| 0 218 550 | 4/1987 | European Pat. Off. . |
| 0 330 495 | 8/1989 | European Pat. Off. . |
| 1150917 | 6/1963 | Germany .............................. 198/412 |
| 2 346 407 | 3/1974 | Germany . |
| 2 224 986 | 5/1990 | United Kingdom . |

*Primary Examiner*—James R. Bidwell
*Attorney, Agent, or Firm*—Venable; Gabor J. Kelemen

[57] ABSTRACT

An apparatus for aligning flat, generally rectangular items includes a first conveyor for advancing the items in a conveying direction; a second conveyor for receiving the items from the first conveyor and for advancing the items in the same conveying direction; an endless conveyor chain having a length portion curved in a horizontal plane and being at a height level above the conveying plane of the second conveyor; a plurality of uniformly spaced carrier elements secured to the conveyor chain for catching items that have been advanced on the second conveyor and for guiding the items in a curvilinear path; and a third conveyor for receiving the items from the conveyor chain.

11 Claims, 3 Drawing Sheets

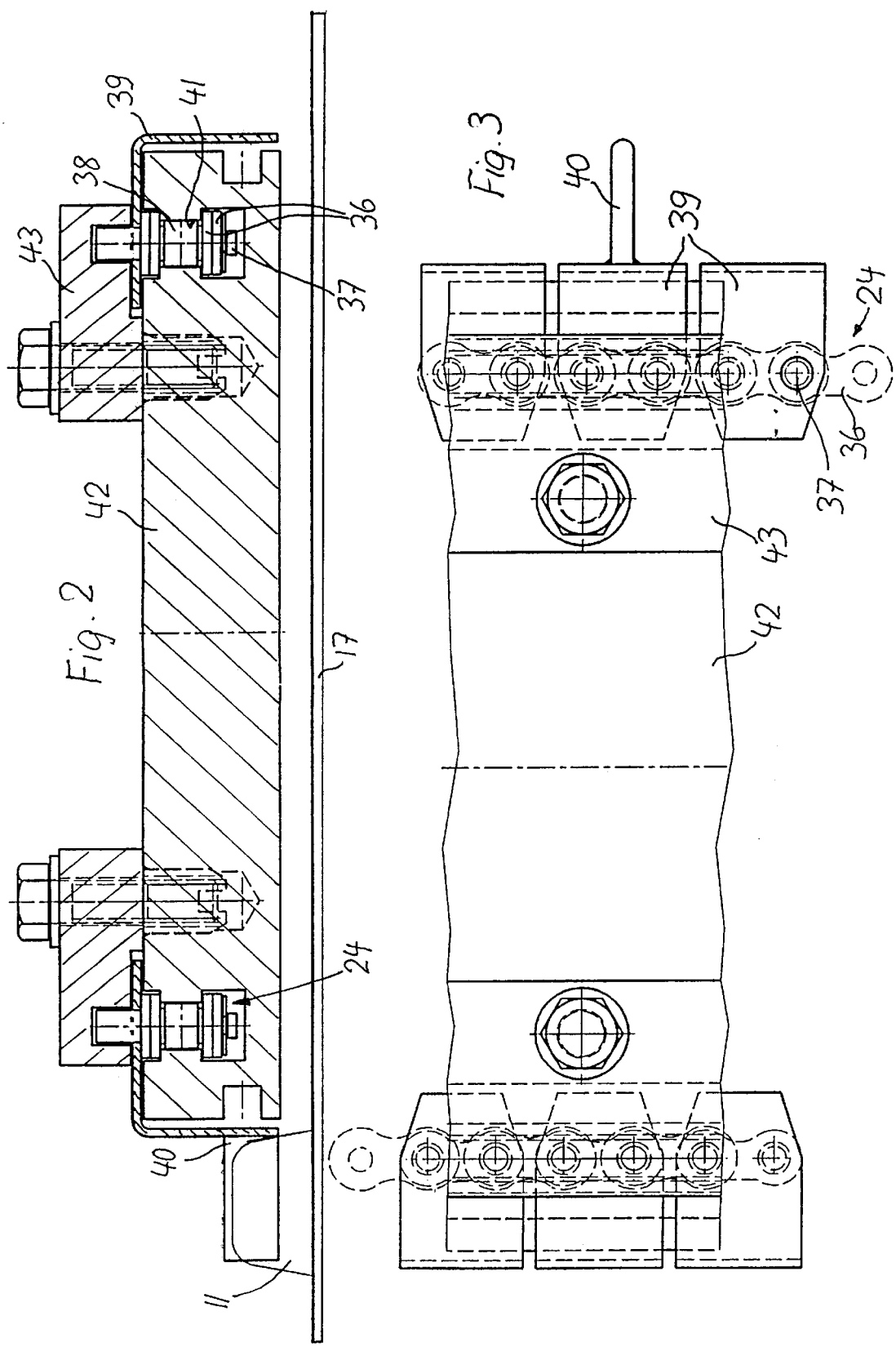

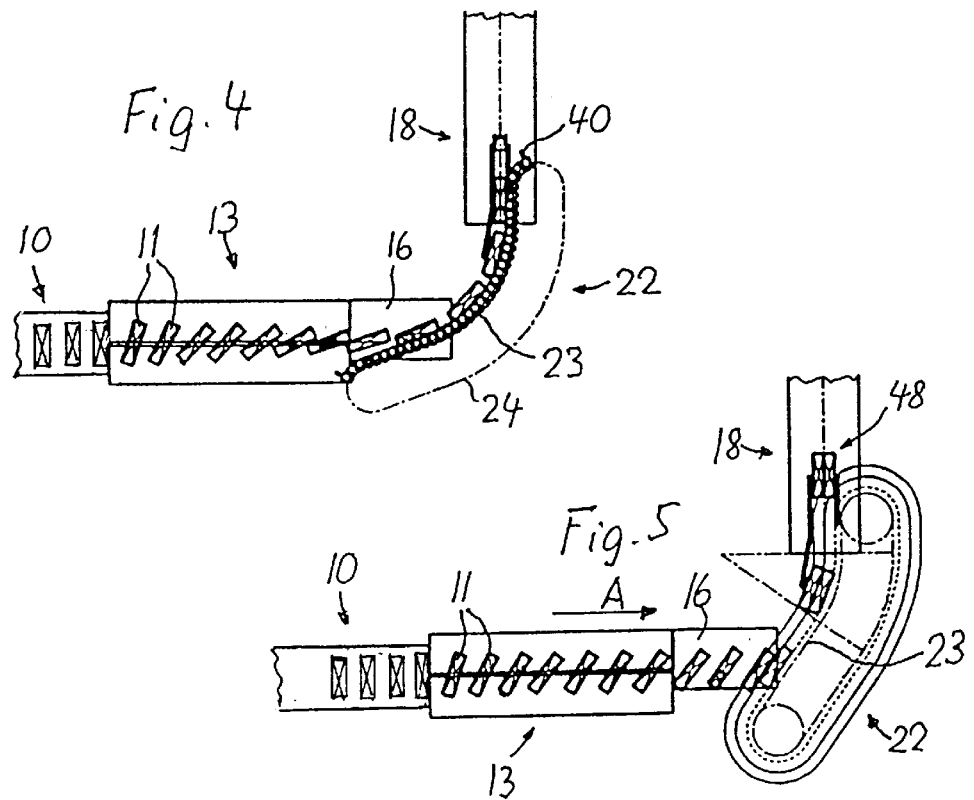
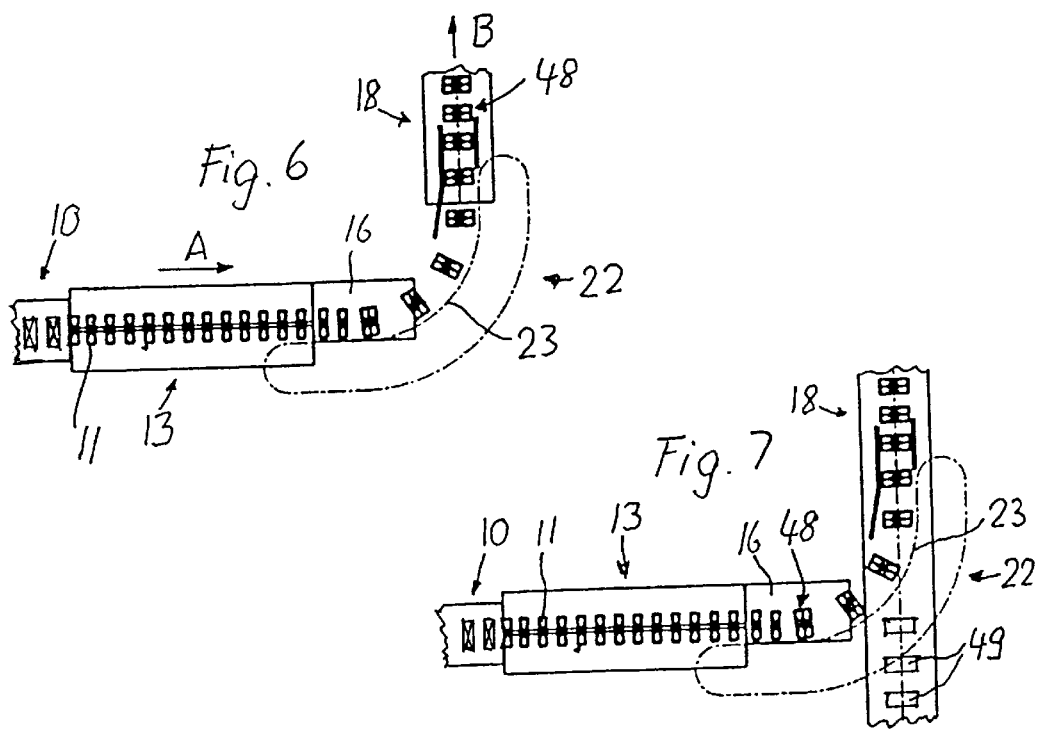

APPARATUS FOR ALIGNING ITEMS HAVING AN APPROXIMATELY RECTANGULAR FOOTPRINT

CROSS REFERENCE TO RELATED APPLICATION

This application claims the priority of Swiss Application No. 1465/97 filed Jun. 16, 1997, which is incorporated herein by reference.

BACKGROUND OF THE INVENTION

This invention relates to an apparatus for aligning items, particularly chocolate bars, having an approximately rectangular outline in plan view (footprint) and for supplying the items to a subsequent processing apparatus, such as a packing machine.

Known apparatus of the above-outlined type which align items to be advanced to a packing machine, for example, a packing machine which wraps the items in a tubular bag wrapper, are in most instances designed for a predetermined item size and a predetermined type of alignment and therefore do not have optimal flexibility for various applications.

SUMMARY OF THE INVENTION

It is an object of the invention to provide an improved apparatus of the above-outlined type from which the discussed disadvantage is eliminated.

This object and others to become apparent as the specification progresses, are accomplished by the invention, according to which, briefly stated, the apparatus for aligning flat, generally rectangular items includes a first conveyor for advancing the items in a conveying direction; a second conveyor for receiving the items from the first conveyor and for advancing the items in the same conveying direction; an endless conveyor chain having a length portion curved in a horizontal plane and being at a height level above the conveying plane of the second conveyor; a plurality of uniformly spaced carrier elements secured to the conveyor chain for catching items that have been advanced on the second conveyor and for guiding the items in a curvilinear path; and a third conveyor for receiving the items from the conveyor chain.

BRIEF DESCRIPTION OF THE DRAWINGS

FIG. 2 is a sectional end elevational view of a chain conveyor forming part of the construction shown in FIG. 1.

FIG. 3 is a top plan view of the construction shown in FIG. 2.

FIGS. 4, 5, 6 and 7 are schematic top plan views of several additional preferred embodiments of the invention.

DESCRIPTION OF THE PREFERRED EMBODIMENTS

Figure 1:
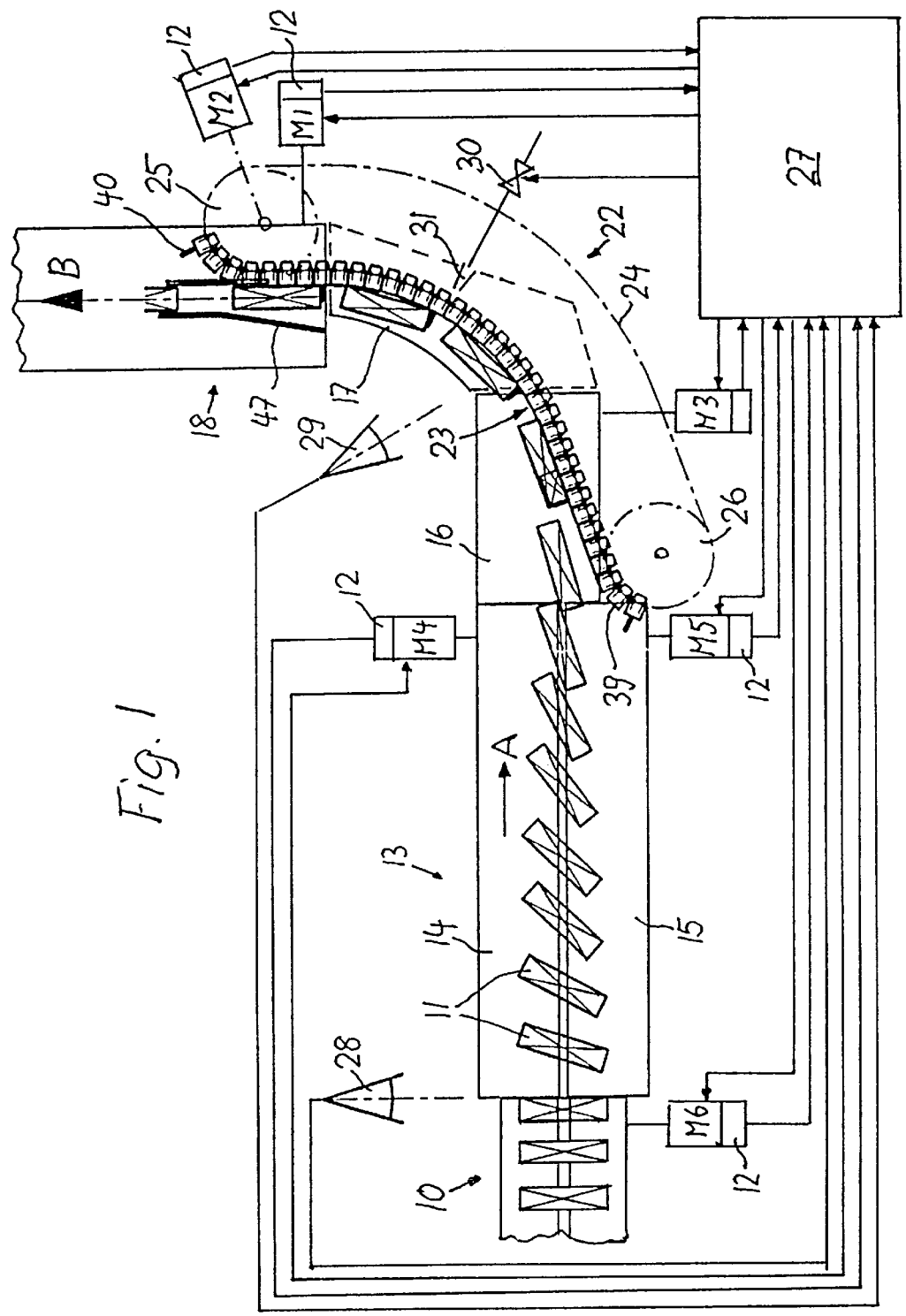
FIG. 1 is a schematic top plan view of an apparatus according to a preferred embodiment of the invention.

Turning to FIG. 1, the apparatus shown therein includes a first conveyor belt 10 on which rectangular items 11, for example, chocolate bars to be wrapped are advanced in such a manner that their longitudinal axis is oriented transversely to the conveying direction A. The conveyor belt 10 is driven by a servomotor M6 which includes an angular position sensor 12. From the output end of the conveyor belt 10 the items 11 are transferred to an input end of a second conveyor 13 which is composed of two side-by-side arranged conveyor belts 14, 15 which are driven by separate servomotors M4, M5 having respective angular position sensors 12. At the downstream end (as viewed in the direction of item advance) the conveyor 13 is adjoined by an intermediate conveyor belt 16 which is narrower than the conveyor belt 10 and the conveyor 13. The direction of advance A of the belts 10, 14, 15 and 16 is identical.

The items 11 move from the intermediate conveyor belt 16 onto a slide 17 and therefrom to a third conveyor 18 which may be a conveyor belt or a conveyor chain with carrier elements which advance the items 11 to a non-illustrated packing machine. The conveyor 18 and the belt 16 are driven by separate servomotors M1 and M3 each provided with a respective angular position sensor 12.

A chain conveyor 22 advances the items 11 from the belt 16 on the slide plate 17 to the conveyor 18. The chain conveyor 22 is situated above the belt 16, the slide plate 17 and the conveyor 18. Along its working section 23 the chain 24 of the chain conveyor 22 runs in a horizontally curved guide track. At opposite ends of the working section 23 the chain 24 is guided over respective sprockets 25, 26, one of which is driven by a servomotor M2 having an angular position sensor 12. All the motors M1–M5 and the angular position sensors 12 are connected to a control device 27. Also, a sensor 28 at the downstream (output) end of the belt 10 and a sensor 29 situated above the slide plate 17 are connected to the control device 27. While the purpose of the sensor 28 will be described later, the sensor 29 monitors the correct position of the items on the conveyor chain, and in case an incorrect position or a defective item is detected, the control device 27 actuates a valve 30 which is connected with a pneumatic source and a blow nozzle 31 to remove the incorrectly oriented or defective items 11 from the slide plate 17 by an air blast.

FIGS. 2 and 3 show a portion of the chain conveyor 22 in greater detail. The endless chain 24 of the conveyor 22 is composed of chain links 36 and link pins 37. A roller 38 is rotatably supported on each pin 37 between the axially spaced chain links 36. L-shaped guide plates 39 are inserted from above into the chain 24 such that each guide plate 39 is supported by two consecutive pins 37. Uniformly spaced carrier elements 40 project outwardly from selected guide plates 39. The rollers 38 travel on a closed guide track 41 which is horizontally curved along the working section 23 and which is formed as a T-groove in a carrier plate 42. On the plate 42 a stepped guide plate 43 is secured by screws for guiding the guide plates 39.

If required, the conveyor belts 10, 14, 15 and 16 may be perforated. Underneath the working section of the conveyor belts vacuum hoods may be provided to urge the items against the conveyor surfaces by vacuum pressure to ensure that the items 11 better follow the controlled motions, as described in U.S. Pat. No. 4,815,581 which is incorporated herein by reference.

In the description which follows, the operation of the described apparatus will be set forth, referring first to FIG. 1.

On the first conveyor belt 10 items 11 are advanced such that their longitudinal axis is oriented transversely to the conveying direction A. The belts 14 and 15 of the conveyor 13 run with constant, but different speeds. As a result, the items 11 are turned in such a manner that their longitudinal axis will form an acute angle with the conveying direction A. The belt 16 too, runs with a constant speed which is higher than the speed of the belt 14 to form a uniform and/or greater distance between the items 11. The chain 24 is driven by the motor M2 with constant speed.

The belt 10 is, as determined by the sensor 28 and the angular position sensors 12 of the motors M2, M3, M4 and M5, activated in a timed manner such that the items 11, as they are advanced by the belt 16, arrive into the working section 23 of the chain 24 immediately in front of a carrier element 40. The carrier elements 40 and the guide plates 39 align the items 11 such that their longitudinal axis will be oriented in the conveying direction B of the output conveyor 18. In the illustrated embodiment such an orientation is at 90° to the conveying direction A. That end of the working section 23 which extends over the upstream end of the conveyor 18 is, immediately in front of the sprocket 25, oriented parallel to the conveying direction B. Preferably, the direction B deviates by less than 20° relative to the tangent at the downstream end of the working section 23. In contrast, at the upstream end the working section 23 is inclined to a greater extent relative to the direction A to ensure that the items 11 are more securely caught by the carrier elements 40. At the inlet of the conveyor 18 additional guide plates 47 may be provided.

FIG. 4 is a simplified illustration of the apparatus according to FIG. 1. In FIGS. 5, 6 and 7 variants for driving the apparatus are illustrated wherein similar components are designated with the same reference numerals.

With the apparatus according to the invention groups 48 each consisting of two or more items 11 may be formed on the chain conveyor 22. FIG. 5 shows a variant in which the items 11 are cycled onto the conveyor 13 in such a manner that at the conveyor chain 24 always two items 11 meet in front of a carrier element 40 whereupon the latter pushes the items jointly onto the conveyor 18. For this purpose the working section 23 forms, at the upstream end, a greater angle (approximately 60°) with the conveying direction A of the conveyors 13, 16. If needed, the chain conveyor 22 may also be operated in a cadenced (cycled) manner.

According to a variant illustrated in FIG. 6, the upstream end portion of the working section 23 of the chain conveyor 22 is approximately parallel to the conveying direction A. The belts 14, 15 run with identical speeds so that the items 11 are not turned as they are advanced on the conveyor 13. Again, groups 48 of two items are formed which are, with the longitudinal axes of the items 11, oriented transversely to the conveying direction B of the conveyor 18 and are transferred thereto.

FIG. 7 illustrates a variant of the embodiment shown in FIG. 6 in which a device for supplying cardboard pieces 49 is arranged upstream of the conveyor 18. The size and shape of the pieces 49 correspond to the footprint of the item groups 48. The conveyor 18 is designed as a conveyor belt which is extended upstream beyond the axis of the conveyors 10, 13 and 16. The slide plate 17 (not shown in FIG. 7 for clarity) is thin and is disposed above the belt 18 at a slight distance therefrom. The cardboard pieces 49 are cycled onto the belt 18 in such a manner that they always arrive underneath the slide plate 17 at the downstream end thereof simultaneously with a group 48 which is then pushed onto the cardboard piece 49. The groups 48 are packed in the packing machine jointly with the cardboard pieces 49.

The described apparatus distinguishes itself by its versatility. The items 11 may be turned from an orientation transverse to the direction of conveyance to an orientation parallel therewith or may be transferred to the conveyor 18 with an unchanged orientation. The apparatus is also adapted to group the items 11. The angular orientation at which the apparatus is installed may be selected within wide limits. Further, a simultaneous introduction of cardboard pieces is possible. Rectangular items may be introduced into the packing machine in an accurately oriented manner. Further, the apparatus has only a small spatial requirement, it has a high output, it is operationally safe and its maintenance is simple. The division of the carrier elements 40 may be readily changed by reinserting the guide plates 39 according to a different pattern to thus adapt the apparatus in a simple manner to different item lengths. Since the chain length has to be an integer multiple of the division, it is expedient to provide that the position of the upstream chain sprocket 26 is adjustable parallel to the direction of the working section 23 at the upstream end thereof. In this manner the chain length may be adjusted by removing or inserting a corresponding even number of chain links. Then, in the carrier plate 42 and the guide plate 43 a corresponding number of intermediate pieces are inserted whose width is an integer multiple of the chain division. The carrier plate 42 and the guide plate 43 may be subdivided into segments which are interconnected end-to-end. In such a case-the shape of the chain conveyor, that is the angle of item re-orientation may be adapted to requirements by replacing linear segments by curved segment or conversely.

It will be understood that the above description of the present invention is susceptible to various modifications, changes and adaptations, and the same are intended to be comprehended within the meaning and range of equivalents of the appended claims.

What is claimed is:

1. An apparatus for aligning flat, generally rectangular items, comprising
   (a) a first conveyor for advancing the items in a conveying direction; said first conveyor having an output end;
   (b) a second conveyor for advancing the items in said conveying direction; said second conveyor having a conveying plane and an input end adjoining said output end of said first conveyor for receiving the items on said conveying plane from said first conveyor;
   (c) an endless conveyor chain having a length portion curved in a horizontal plane; said length portion having an output end and being at a height level above said conveying plane;
   (d) a plurality of uniformly spaced carrier elements secured to said conveyor chain for catching items advanced on said second conveyor and for guiding the items in a curvilinear path;
   (e) a third conveyor for advancing the items; said third conveyor having an input end adjoining said output end of said conveyor chain for receiving the items from said conveyor chain;
   (f) a sensor positioned at said output end of said first conveyor for generating signals upon passage of items; and
   (g) control means for receiving said signals and for cyclically driving said first conveyor based on said signals such that the items are at a uniform spacing on said second conveyor in synchronism with an advance of said carrier elements of said conveyor chain.

2. The apparatus as defined in claim 1, wherein said advancing direction is a first advancing direction; said third conveyor having a second advancing direction being different from said first advancing direction.

3. The apparatus as defined in claim 1, wherein said second conveyor has an output end; further wherein said second conveyor comprises item-turning means having an idle state and an operative state; in said idle state each item having the same orientation at said input of said second conveyor and at said output thereof and in said operative state each item having a different orientation at said input of said second conveyor and at said output thereof.

4. The apparatus as defined in claim 3, wherein said item-turning means comprises first and second, side-by-side running conveyor belts forming part of said second conveyor and means for driving said first and second conveyor belts at identical speeds to maintain said idle state of said item-turning means and for driving said first and second conveyor belts at different speeds to maintain said operative state of said item-turning means.

5. An apparatus for aligning flat, generally rectangular items, comprising
   (a) a first conveyor for advancing the items in a conveying direction; said first conveyor having an output end;
   (b) a second conveyor for advancing the items in said conveying direction; said second conveyor having a conveying plane and an input end adjoining said output end of said first conveyor for receiving the items on said conveying plane from said first conveyor; said second conveyor having an output end;
   (c) an endless conveyor chain having a length portion curved in a horizontal plane; said length portion having an output end and being at a height level above said conveying plane;
   (d) a plurality of uniformly spaced carrier elements secured to said conveyor chain for catching items advanced on said second conveyor and for guiding the items in a curvilinear path;
   (e) a third conveyor for advancing the items; said third conveyor having an input end adjoining said output end of said conveyor chain for receiving the items from said conveyor chain; and
   (f) an intermediate conveyor adjoining said output end of said second conveyor for receiving the items from said second conveyor; said length portion of said conveyor chain being situated above said intermediate conveyor, whereby said carrier elements catch the items while being advanced on said intermediate conveyor.

6. An apparatus for aligning flat, generally rectangular items, comprising
   (a) a first conveyor for advancing the items in a conveying direction; said first conveyor having an output end;
   (b) a second conveyor for advancing the items in said conveying direction; said second conveyor having a conveying plane and an input end adjoining said output end of said first conveyor for receiving the items on said conveying plane from said first conveyor;
   (c) an endless conveyor chain having a length portion curved in a horizontal plane; said length portion having an output end and being at a height level above said conveying plane;
   (d) a plurality of uniformly spaced carrier elements secured to said conveyor chain for catching items advanced on said second conveyor and for guiding the items in a curvilinear path;
   (e) a third conveyor for advancing the items; said third conveyor having an input end adjoining said output end of said conveyor chain for receiving the items from said conveyor chain; and
   (f) means situated upstream of said third conveyor for supplying cardboard pieces to said third conveyor.

7. An apparatus for aligning flat, generally rectangular items, comprising
   (a) a first conveyor for advancing the items in a conveying direction; said first conveyor having an output end;
   (b) a second conveyor for advancing the items in said conveying direction; said second conveyor having a conveying plane and an input end adjoining said output end of said first conveyor for receiving the items on said conveying plane from said first conveyor;
   (c) an endless conveyor chain having a length portion curved in a horizontal plane; said length portion having an output end and being at a height level above said conveying plane;
   (d) a plurality of uniformly spaced carrier elements secured to said conveyor chain for catching items advanced on said second conveyor and for guiding the items in a curvilinear path;
   (e) a third conveyor for advancing the items; said third conveyor having an input end adjoining said output end of said conveyor chain for receiving the items from said conveyor chain; and
   (f) vacuum generating means for urging the items against conveying surfaces of said first and second conveyors by vacuum pressure.

8. An apparatus for aligning flat, generally rectangular items, comprising
   (a) a first conveyor for advancing the items in a conveying direction; said first conveyor having an output end;
   (b) a second conveyor for advancing the items in said conveying direction; said second conveyor having a conveying plane and an input end adjoining said output end of said first conveyor for receiving the items on said conveying plane from said first conveyor;
   (c) an endless conveyor chain having a length portion curved in a horizontal plane; said length portion having an output end and being at a height level above said conveying plane;
   (d) a plurality of uniformly spaced carrier elements secured to said conveyor chain for catching items advanced on said second conveyor and for guiding the items in a curvilinear path;
   (e) a third conveyor for advancing the items; said third conveyor having an input end adjoining said output end of said conveyor chain for receiving the items from said conveyor chain;
   (f) a slide plate disposed between said second and third conveyors for supporting the items as they are advanced by said conveyor chain;
   (g) a sensor disposed above said slide plate for generating a signal upon sensing a defective item; and
   (h) ejecting means for receiving said signal and for pushing the defective item off said slide plate upon receiving said signal.

9. The apparatus as defined in claim 8, wherein said slide plate has a length corresponding at least to a spacing between any two consecutive said carrier elements.

10. The apparatus as defined in claim 8, wherein said ejecting means comprises
    (a) a blow nozzle;
    (b) a pneumatic source connected to said blow nozzle; and
    (c) a valve controlled by said signal and cooperating with said blow nozzle to connect said blow nozzle to or to disconnect said blow nozzle from said pneumatic source.

11. The apparatus as defined in claim 10, wherein said third conveyor has a central longitudinal axis and further wherein said second conveyor has an output end being situated upstream of said central longitudinal axis, as viewed in said conveying direction of said second conveyor.

* * * * *